United States Patent [19]

Rausch

[11] 3,746,287

[45] July 17, 1973

[54] TAPE DRIVE SYSTEM

[75] Inventor: Manfred Rausch, Nurnberg, Germany

[73] Assignee: Siemens Aktiengesellschaft, Berlin and Munich, Germany

[22] Filed: Sept. 28, 1970

[21] Appl. No.: 75,884

[30] Foreign Application Priority Data

Sept. 30, 1969 Germany .................. P 19 49 249.0

[52] U.S. Cl. .................. 242/206, 242/204, 242/207, 242/209, 346/136

[51] Int. Cl. ........................ G11b 15/29, G11b 15/22

[58] Field of Search .................... 242/206, 207, 208, 242/209, 201, 202, 204; 346/136

[56] References Cited

UNITED STATES PATENTS

| | | | |
|---|---|---|---|
| 3,026,634 | 3/1962 | Iraxoqui | 242/208 X |
| 2,575,442 | 11/1951 | Cooley | 346/138 |
| 3,017,784 | 1/1962 | Monaghan | 346/138 UX V |
| 2,034,543 | 3/1936 | Twiss et al. | 346/136 X |

*Primary Examiner*—George F. Mautz
*Attorney*—Curt M. Avery, Arthur E. Wilfond, Herbert L. Lerner and Daniel J. Tick

[57] ABSTRACT

A system for intermittently driving a tap is provided with a drive motor having a drive shaft, a supply spool for supplying tape, a take-up spool capable of rotating and storing the tape, a first magnetic coupling means which mechanically connects the take-up spool to the drive shaft, a capstan frictionally engaging one side of the tape between the take-up and supply spools. A second magnetic coupling mechanically connects the capstan to the drive shaft.

9 Claims, 2 Drawing Figures

TAPE DRIVE SYSTEM

Figure 1:
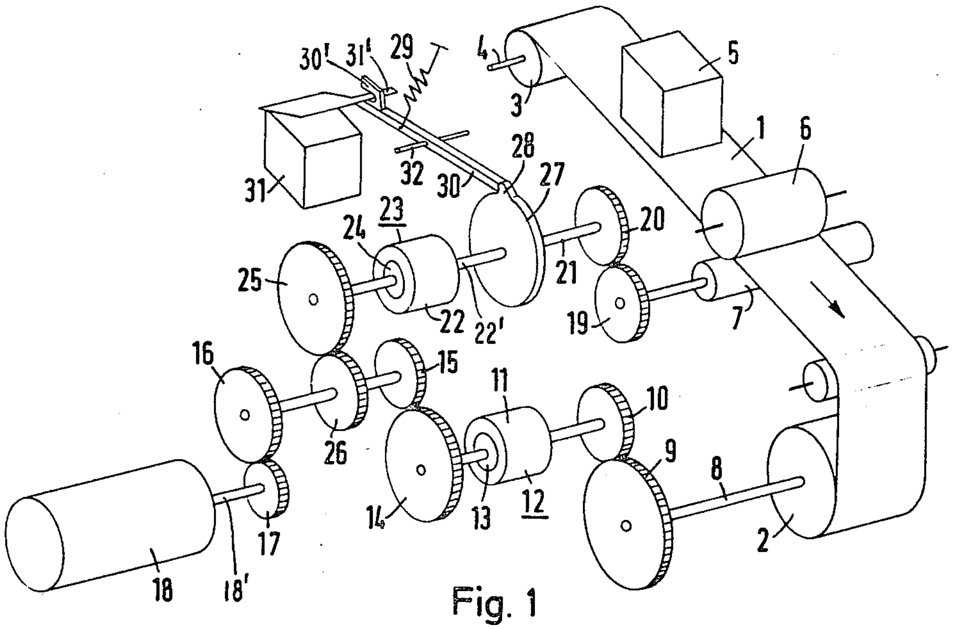

My invention relates to a tape drive system and in a more particular though not exclusive aspect, to a tape drive for magnetic tape.

Remote data registering system are finding increasing usage. In operation, the data to be stored are gathered over a period of time and are periodically recorded on a storage medium. Such remote data collection and storage systems frequently use a tape as the storage medium, and preferably a magnetic tape.

Due to the intermittent nature of the tape motion, complex and expensive systems have been utilized to accurately drive the tape intermittently. Some remote recording systems utilize a continuous tape drive movement which is inefficient and unnecessarily subjects the working elements to wear and tear. Further, where such remote systems utilize a motor which is periodically energized to drive tape, the transients occurring due to the motor energization cause inaccuracies to appear during the recording of the data on the tape.

An object of the present invention is to provide a tape drive system which provides for improved accuracy in the recording of data on the tape medium.

Another object of the present invention is to provide such a tape drive system which minimizes wear on the operative elements utilized for the drive.

Another object of the present invention is to provide such a tape drive system in which the effect of start-up transients of a motor when initially energized is minimized.

Still another object of the present invention is to provide an intermittent tape drive system which quickly and efficiently brings the tape drive speed to its desired constant level prior to the recording of data thereon.

Other objects, advantages and features of the present invention will become more apparent from the following description.

In accordance with the principles of the present invention, the above objects are accomplished by providing a tape drive system for the intermittent driving of a tape. The system comprises a drive motor having a drive shaft, a take-up spool capable of rotating and storing the tape, a supply spool for supplying the tape, a first magnetic clutch means, the take-up spool being mechanically connected to the drive shaft through the first magnetic clutch means, a capstan, the capstan frictionally bearing against the tape causing the tape to move and being located between the take-up and feed spools, and a second magnetic clutch means which mechanically connects the capstan to the drive shaft.

When the tape is to remain stationary, a magnetically operated detent blocks the rotation of the capstan. The magnetic clutch means associated with the capstan enables the drive motor to rotate while the capstan is not subjected to any torque. Additionally, when the capstan is stationary, tape movement is blocked, thus preventing rotation of the take-up spool. The first magnetic clutch means interconnecting the drive shaft with the take-up spool enables the motor to turn while the take-up spool remains stationary. In this manner, the motor may be switched on prior to the removal of the magnetically operated detent and the effect of transients occurring during the start-up period of the motor is eliminated.

In accordance with another feature of the invention, the tape drive system allows the tape to back up and check the data recorded thereon. To accomplish this, the supply spool is connected to the drive shaft through a third magnetic clutch means. A complementary set of ratchet and pawls is utilized to allow the supply spool to move in one direction while the tape is rewound yet rotate freely with a braking action in the other direction with the capstan and take-up spool providing the driving force for the tape. The other ratchet and pawl arrangement associated with the take-up spool allows that spool to rotate relatively freely with a slight braking motion while the tape motion is reversed with the supply spool providing the driving motion for the tape.

Figure 2:
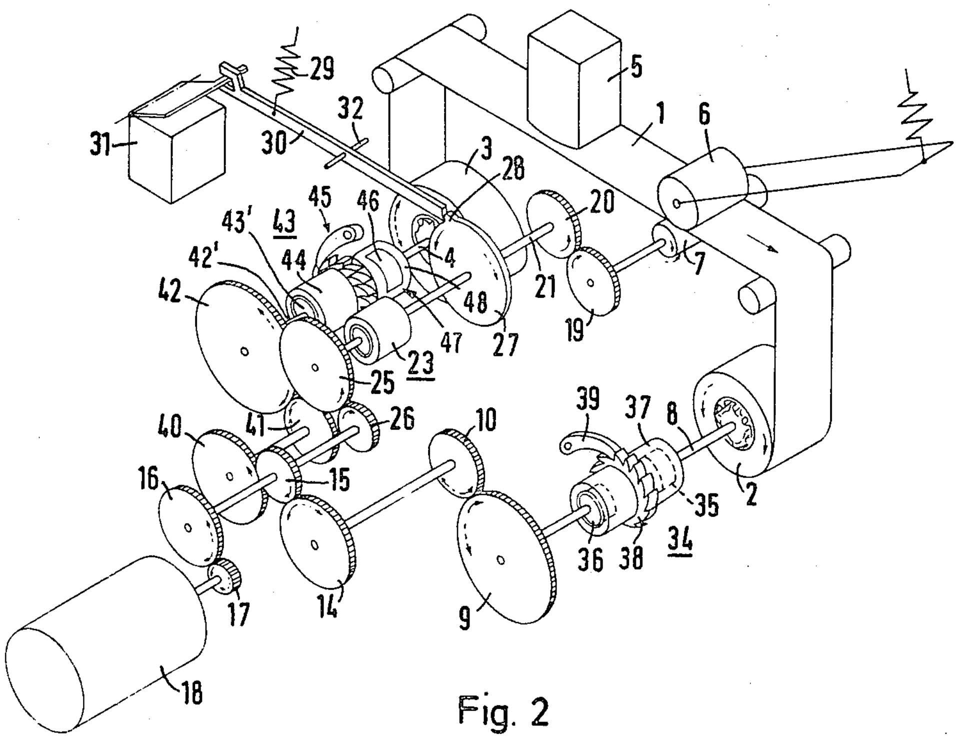

The invention will be further described with reference to embodiments thereof, illustrated by way of example on the accompanying drawing in which:

FIG. 1 is a perspective view of a system for driving the tape in only one direction; and FIG. 2 is a perspective view of a tape drive system capable of moving the tape in both directions.

Referring to the illustrations, particularly to FIG. 1, a tape 1, preferably a magnetic tape, is supplied from a supply spool 3 mounted on a supply shaft 4 which is provided with a conventional brake mechanism (not shown) to minimize and eliminate snarling of the tape 1. The tape is wound onto and stored on a take-up spool 2. The tape passes under a conventional magnetic recording or reproducing head 5 and between a spring-loaded idler 6 and a capstan 7. The capstan and idler roller frictionally engage tape 1, the tape being driven by the capstan 7 in the direction indicated by an arrow.

Take-up spool 2 is mounted on and drives a take-up shaft 8 and is mechanically connected to a magnetic clutch means 12 through spur gears 9 and 10. Magnetic clutch 12 is provided with an inner magnet 13 and a concentric outer magnetic element 11. Inner magnetic element 13 is driven by an electric motor 18 through the mechanical connection of spur gears 14 and 15 and spur gears 16 and 17. Motor 18 preferably is a speed-controlled brushless direct-current motor. When energized, motor 18 causes a drive shaft 18' to rotate, driving spur gears 17 and 16. Spur gear 15 is mounted to the same shaft as spur gear 16 and when drive shaft 18' is rotated, spur gear 15 also turns, causing its meshing gear 14 to rotate thereby turning magnetic element 13.

A spur gear 26 which rotates with spur gear 16 meshes with a spur gear 25 causing a magnetic element 24 of a magnetic clutch 23 to also rotate. Magnetic clutch 23 is provided with an outer concentric magnetic element 22 and operates in a manner similar to magnetic clutch 12. Magnetic element 22 causes a shaft 22' to rotate. Mounted on shaft 22' is a cam disc 27 having a projecting member 28. Shaft 22' is directly coupled with a shaft 21 causing a spur gear 20 to rotate meshing with a spur gear 19 which is directly coupled to capstan 7. A magnetic detent 30 is capable of being in a blocking and a non-blocking position, and is shown in FIG. 1 in the blocking position abutting against projecting member 28. Detent 30 is moved between its respective positions under control of a trip magnet 31 under control of a spring 29 attached to the detent and a pivot pin 32. Trip magnet 31 is provided with a projecting finger 31' which communicates with a slotted engaging member 30' located on one end of detent 30. When trip magnet 31 is energized, lever or arm 31' moves downward causing detent 30 to be moved upward away from the projecting member 28 thereby permitting cam disc 27 to rotate.

The operation of the unidirectional tape drive system shown in FIG. 1 is as follows:

While data is being collected at a remote station, tape 1 is preferably held in a stationary position, and drive motor 18 is not energized. Due to the action of the magnetic clutches 12 and 23, motor 18 could continuously run without causing tape 1 to be moved. The blocking action of detent 30 against projecting member 28 of cam disc 27 prevents capstan 7 from rotating even though motor 18 and its drive shaft 18′ are turning. By holding shaft 22′ stationary, magnetic element 22 is also held stationary while magnetic element 24 is allowed to rotate while being driven by drive shaft 18′. The clutching action of clutch 23 allows for the slippage between the two magnetic elements without deleteriously affecting the operation of motor 18. Since tape 1 is stationary due to the fixed position of capstan 7, take-up spool 2 is also stationary, thereby maintaining outer concentric magnetic element 11 in a fixed position. Due to the clutching action of magnetic clutch 12, the inner magnetic element 13 may rotate with the turning action of drive shaft 18′. To preserve the life of the motor, it is preferable to have motor 18 deenergized during the period while data is being collected at a remote station and tape 1 is stationary. In order to eliminate transients associated with the start-up of motor 18, the magnetic clutch action described above is utilized by the energization of motor 18 prior to the movement of detent 30 from its blocking to its non-blocking position. In this fashion, motor 18 achieves a steady state operation while tape 1 is not driven, thus allowing the tape to move at a desired steady rate for recording.

When detent 30 is moved from the blocking to the non-blocking position under control of trip magnet 31, the cam disc 27 is free to rotate one revolution. If detent 30 were in its non-blocking position for a longer period of time, the cam disc 27 could rotate more than one revolution. The gearing ratio of spur gears 19, 20, and capstan 7 allows the tape to be driven a predetermined lineal distance during the single revolution of cam disc 27. This predetermined lineal distance is sufficient to record the collected data through recording head 5. After cam disc 27 completes a single revolution, motor 18 is again deenergized and tape 1 is stopped. Subsequently, intermittent recording of the data onto tape 1 is accomplished in the same fashion as described above.

FIG. 2 illustrates a drive system for intermittently moving the tape 1 either in a forward or a reverse direction to permit checking of the data stored thereon. Similar numerals are used in FIG. 2 to denote the same elements described above in FIG. 1. Interposed between take-up shaft 8 and spur gear 9 is an additional magnetic clutch arrangement 34 such as a hysteresis coupler. The hysteresis coupler is provided with an inner magnetic element 35 and a concentric outer magnetic element 37 located between shaft 8 and a ratchet and pawl assembly 38 and 39 respectively. A magnetic clutch arrangement 36 similar to 12 of FIG. 1 is provided between the ratchet and pawl assembly and spur gear 9. The ratchet and pawl assembly permits rotation of shaft 8 in the take-up direction but retards rotation of shaft 8 in the wind-up direction. A complementary ratchet and pawl assembly 45 controls supply shaft 4 which allows rewinding of the tape but retards the feed thereof. Spur gear 15 meshes with a spur gear 40 which causes rotation of spur gears 41 and 42. Shaft 42′ is rotated by spur gear 42 and causes an inner magnetic element 43′ to also rotate. Inner magnetic element 43′ magnetically is coupled to a concentric outer magnetic element 44 in a manner similar to the magnetic clutch arrangements described in FIG. 1.

When the tape is to be driven in the forward direction, motor 18 is energized prior to the movement of detent 30 from its blocking to a non-blocking position. A ratchet and pawl assembly which is magnetically coupled to supply shaft 4 prevents rotation of an inner magnetic element 46 forming a part of a magnetic clutch assembly 47 having an outer concentric magnetic element 48. Although the ratchet and pawl assembly 45 is in a blocking position preventing rotation of the inner magnetic element 46, the magnetic interaction between elements 46 and 48 serves as a retarding or braking force on supply shaft 4 while the tape is being moved in the direction of the solid arrow, thus eliminating tape snarl. When the tape is to be driven in the reverse direction, as indicated by the dotted arrow, the ratchet and pawl arrangement 38 and 39, respectively, serve to provide a braking force on tape-up shaft 8 while ratchet and pawl assembly 45 allows supply shaft 4 to rotate and serve as the drive causing the tape to move in the reverse direction. The braking action on shaft 8 prevents snarling of the tape while in motion. When the tape is rewound, the projecting member 28 is free to rotate for one revolution without being blocked by detent 30.

Drive motor 18 is a reversible motor capable of rotating in either direction, Polar reversal of the motor for rewinding may be achieved by a manual switch actuation or by remote control in a conventional manner.

It may thus be seen that FIG. 2 illustrates a tape drive system with the tape being driven in a forward and a reverse direction. A first means including the magnetic coupling 34 and a first ratchet and pawl assembly 38 and 39 respectively are mechanically connected between the drive shaft and take-up spool permitting the take-up spool to be freely driven by the drive shaft when the tape is moved in the forward direction and for providing a braking action on the take-up spool 2 when the tape is moved in the reverse direction. A second means is provided including the third magnetic coupling 43 and a second ratchet and pawl assembly 45 which is mechanically connected between the drive shaft and supply spool for permitting the supply spool 3 to be freely driven by the drive shaft when the tape is moved in the reverse direction and for providing the braking action on the supply spool when the tape is moved in the forward direction.

It will thus be seen that the objects set forth above, among those made apparent from the preceding description, are efficiently attained and, since certain changes may be made in the above method and apparatus without departing from the scope of the invention, it is intended that all matter contained in the above description and shown in the accompanying drawings shall be interpreted as illustrative and not in a limiting sense.

I claim:

1. A tape drive system for the intermittent driving of a tape, comprising a drive motor having a drive shaft, a supply spool for supplying the tape, a first magnetic coupling means, a take-up spool being mechanically connected to said drive shaft through said first magnetic coupling means, capstan means for frictionally engaging and driving the tape, said capstan means being located between said take-up and said supply spool, a second magnetic coupling means mechanically connecting said capstan means to said drive shaft, and stop means for preventing said capstan means from rotating when said drive shaft is rotating whereby said capstan means frictionally engages said tape and prevents the latter from being driven, said stop means being located between said drive shaft and said capstan means.

2. A tape drive system as set forth in claim 1, wherein each of said first and second magnetic coupling means is a hysteresis coupler having a pair of magnetic concentric elements, one of said pair of concentric elements being capable of rotating while the other of said pair is stationary.

3. A tape drive system as set forth in claim 1, wherein said stop means comprises a detent member and a cam disc having a projection, said cam disc being mechanically connected between said second magnetic coupling means and said capstan means, said cam disc having one rotational position defining a blocking position wherein said detent member abuts said projection to prevent rotation of said cam disc and said capstan means, said cam disc having another rotational position defining a non-blocking position wherein said projection is spaced from said detent member such that said detent member does not prevent rotation of said cam disc and said capstan means, said second magnetic coupling means being operable to selectively engage and disengage said drive shaft with said capstan means thereby allowing said capstan means to remain stationary while said drive shaft is rotated when said cam disc is in the blocking position.

4. A tape drive system as set forth in claim 3, wherein said detent permits a single revolution of said cam disc when said detent is moved from said blocking position.

5. A tape drive system as set forth in claim 1, wherein said tape is driven in a forward and reverse direction, a first hysteresis coupler means having magnetic devices operable as coupling or braking elements, said first hysteresis coupler means being mechanically connected between said drive shaft and said take-up spool for permitting said take-up spool to be freely driven by said drive shaft when said tape is moved in said forward direction and for providing a braking action on said take-up spool when said tape is moved in said reverse direction, a second hysteresis coupler means having magnetic devices operable as coupling or braking elements, said second hysteresis coupler means being mechanically connected between said drive shaft and said supply spool for permitting said supply spool to be freely driven by said drive shaft when said tape is moved in the reverse direction and for providing a braking action on the supply spool when the tape is moved in the forward direction.

6. A tape drive system as set forth in claim 5, wherein said motor is a speed-controllable brushless D.C. motor.

7. A tape drive system as set forth in claim 1, said capstan means comprising a pressure roller, and a capstan mechanically connected to said drive shaft via said second magnetic coupling means, said pressure roller and said capstan mutually engaging the tape in a friction-like manner.

8. A tape drive system as set forth in claim 1, said first and second magnetic coupling means being respective hysteresis couplers.

9. A tape drive system for the intermittent driving of a tape in a forward and reverse direction, comprising a drive motor having a drive shaft, a supply spool for supplying the tape, a take-up spool for storing the tape, a first magnetic coupling means, said take-up spool being mechanically connected to said drive shaft through said first magnetic coupling means, a capstan means for frictionally engaging and driving the tape, said capstan means being located between said take-up and said supply spool, a second magnetic coupling means mechanically connecting said capstan means to said drive shaft, each of said first and second magnetic coupling means being a hysteresis coupler, a first means mechanically connected between said drive shaft and said take-up spool for permitting said take-up spool to be freely driven by said drive shaft when said tape is moved in said forward direction and for providing a braking action on said take-up spool when said tape is moved in said reverse direction, said first means including said first magnetic coupling and a first ratchet and pawl assembly, and a second means mechanically connected between said drive shaft and said supply spool for permitting said supply spool to be freely driven by said drive shaft when said tape is moved in the reverse direction and for providing a braking action on the supply spool when the tape is moved in the forward direction, said second means including a third coupling and a second ratchet and pawl assembly.

* * * * *